Patented Oct. 23, 1951

2,572,035

UNITED STATES PATENT OFFICE 2,572,035

PLASTIC TALL OIL ROSIN FRACTION

Wesley A. Jordan and Melvin S. Herban, Minneapolis, Minn., assignors to General Mills, Inc., a corporation of Delaware No Drawing. Application August 14, 1948,
Serial No. 44,396

8 Claims. (Cl. 260—97.5)

Tall oil is an oil recovered from paper-making operations and contains approximately 40–45% of fatty acids, 45–50% of rosin acids, and 5–15% of non-saponifiables. Various methods have been evolved for utilizing tall oil, either in its original state or by fractionating it in one way or other to recover the fatty acids and the rosin acids. One method of effecting such fractionation involves fractional distillation which results in a recovery of a large proportion of the fatty acids, and which also results in the recovery of a rosin acid fraction which may contain substantial quantities of fatty acid and a small amount of unsaponifiable material. A typical rosin fraction from tall oil will contain approximately 69% rosin and approximately 29% fatty acid. The amount of rosin may vary from 65% to 75% and the fatty acid may vary from about 25% to 35%, with a very minor amount of unsaponifiable material.

The price of tall oil is relatively low and accordingly the fatty acids recovered from it can be available at a relatively low price provided some disposition of the rosin fraction can be made. This rosin fraction represents about 45% of the total yield of products from tall oil and presents very definite problems in disposition at a price which will offset its cost of manufacture. The rosin fraction described above when warm is a homogeneous liquid, but upon cooling becomes a heterogeneous mixture of rosin crystals and liquid fatty acids, making handling of it an extremely irksome procedure. A drum of the rosin fraction when cool will contain a layer of hard rosin at the bottom, a layer of fatty acid-rosin slush in the middle, and a layer of liquid fatty acid at the top. Inasmuch as rosin is ordinarily used for further processing, for example, the production of ester gum or for the production of varnish, it becomes necessary to transfer the rosin product to a processing kettle.

While commercial rosin presents its own handling difficulties, it is still easier to handle than the above tall oil rosin fraction. The greater ease of handling of commercial rosin has been a further reason for dissatisfaction with present tall oil rosin fractions. Commercial rosin is a solid at ordinary temperature, and any processor who uses rosin can merely cut open the drum in which the rosin is shipped and chop it up into suitable size pieces which may then be dumped into the processing kettle. Since the above rosin fraction of tall oil, however, contains an appreciable quantity of liquid fatty acid, it will be appreciated that this possibility of transferring the material from the drum to the processing kettle is not feasible. Likewise, since the rosin fraction has a hard cake at the bottom of the drum, the contents cannot be dumped out of the drum. Moreover, it is not economically feasible to heat the drums up to suitable temperatures to liquefy the rosin fraction. Some of the rosin crystals in the rosin fraction have melting points of about 275° F. Obviously the provision of means for liquefying the rosin in the drums and for pumping the liquid rosin into a processing kettle would be prohibitive, particularly where the temperature of the rosin must be elevated to 275° F. or higher. Thus even though the price of tall oil rosin fraction may be materially lower than that of industrial rosin, and even though coating products made from this fraction have superior quality, most manufacturers are willing to forego these advantages in order to eliminate the difficult handling encountered with this tall oil rosin fraction.

Even the use of commercial rosin in processing presents difficulties. Thus, for example, in the production of varnish it is customary to body the drying oil in a processing kettle, and at the completion of the bodying period, large chunks of rosin which previously had been chopped out of a rosin drum are dumped into the processing kettle for dispersing the oil polymers. The rosin is then neutralized by liming or by esterification with a polyhydric alcohol. It will be apparent that the dropping of large chunks of rosin into a body of oil at bodying temperatures of 500° F. and higher presents a very serious problem and a definite personal injury hazard. Furthermore, the chunks of rosin dropped into the processing kettle invariably settle to the bottom of these direct-fired kettles, and as a result, before the rosin is melted and dispersed in the drying oil there is an excellent opportunity for the rosin to be overheated and thus result in a darkening of the rosin and of the resultant varnish. Furthermore, rosin thus dispersed in a drying oil to produce a varnish is not permanently homogeneously dispersed. It is usually found that such varnishes contain large quantities of resin of a plastic or semi-plastic nature which have settled out into the bottom of the container. Resin thus deposited cannot be redispersed in the varnish.

It has now been found possible to eliminate the difficulties encountered with commercial rosin and also the difficulties heretofore encountered with the rosin fraction from tall oil by converting this rosin fraction to a homogeneous semi-plastic material which readily liquefies upon slight heating such that the material may be transferred from one container to another by means of inexpensive pumps and other equipment. It has been found that this can be accomplished by esterifying the rosin fraction partially with a polyhydric alcohol.

It is therefore an object of the present invention to provide a plastic homogeneous readily liquefiable rosin fraction from tall oil in which the acids are partially esterified with polyhydric alcohols.

It has been found that when this tall oil rosin fraction is partially esterified with a polyhydric alcohol to the extent that the acid number of the partially esterified rosin fraction is reduced from 25% to 50% of the acid value of the tall oil rosin fraction, the partially esterified product is readily handleable and usually can be pumped from one container to another without the necessity for expensive equipment. At the lower end of this range, that is at 25% reduction in acid value, it is found that the product is liquid or plastic for a fairly short period of time, as for example, about two weeks. Thereafter, some crystallization may occur which necessitates a slight warming of the material to make it capable of being pumped. The amount of heating involved, however, is quite minor and is not to be compared with the heating required to liquefy the original tall oil rosin fraction.

It is preferred, however, to operate at about 40% esterification, at which point the rosin fraction is permanently non-crystallizable, and can be readily pumped with a minor amount of heating.

It is usually preferred not to go over 50% esterification of the rosin fraction inasmuch as satisfactory liquid materials can be prepared below this point. Esterification beyond 50% limits the uses to which the material may subsequently be put. For example, a processor may wish to neutralize the remaining acidity with lime or to esterify the remaining acidity with a polyhydric alcohol of a different functionality from that used in the preparation of the plastic tall oil rosin fraction. It is desirable therefore to maintain the degree of esterification as low as possible consistent with ease of handling.

For esterification any polyhdric alcohol may be used. Typical polyhdric alcohols include ethylene glycol, glycerol, pentaerythritol, dipentaerythritol, polypentaerythritol, 2, 2, 6, 6-tetramethylolcyclohexanol, and the like. The esterification reaction may be carried on in any usual manner for esterifying polyhydric alcohols with fatty acids and rosin acids. For example, it has been found that the reaction may be very conveniently carried out as follows: The mixture of rosin fraction and polyhydric alcohol was weighed into a kettle and heated to 232° C. in one-half hour and was held there for one hour. Thereafter the temperature was advanced to 250° C. and held for two additional hours. The material was then cooled and was ready for use.

The following table illustrates typical results which are obtainable by means of the present invention:

| Alcohol Used | Percent Alcohol Used | Acid Value of product | Percent Reduction of acid val. | Estimated Percent of Crystallization |
|---|---|---|---|---|
| | Per cent | | | |
| Ethylene Glycol | 4.0 | 107.6 | 36.7 | Nil |
| | 9.4 | 96.6 | 43.2 | Nil |
| Glycerol | 2.0 | 126.0 | 26.0 | Nil |
| | 4.0 | 101.3 | 40.4 | Nil |
| Pentaerythritol | 3.0 | 122.4 | 28.0 | 1 |
| | 4.0 | 110.4 | 35.0 | 1 |
| Dipentaerythritol | 4.0 | 118.0 | 30.5 | Nil |
| | 12.0 | 81.6 | 52.0 | Nil |
| Polypentaerythritol | 14.0 | 82.2 | 51.6 | Nil |
| Tetramethylolcyclohexanol | 4.0 | 131.5 | 22.6 | 5 |
| | 13.33 | 99.5 | 41.4 | 1 |

In this table the percent of alcohol used was the percent of alcohol by weight based on the weight of the tall oil rosin acid fraction. The estimated percent of crystallization was arrived at by visual examination.

This table shows that at percentage reduction in acid value falling within the range of about 25% to about 50%, the crystallization in the resultant product has been substantially completely eliminated in all cases and the instances in which any crystallization resulted in definitely minor and not objectionable. These products are to be contrasted with similar products in which the percentage reduction in acid value varied from 10-20%, which in general, showed crystallization within the range of 40-90% of that of the original tall oil rosin fraction.

The products of the present invention are pale colored, semi-solid plastic materials which readily liquefy upon the application of a slight amount of heat. They are useful in the manufacture of adhesives, coatings, soap, rubber compounds, and specialities. For example, a partially esterified tall oil rosin fraction produced by esterifying with 5% of glycerol, a rosin fraction containing from 68-72% of rosin acids, and 28-32% of fatty acids with a maximum of 3% of unsaponifiables, is useful in the production of a high quality gloss oil in accordance with the following formula:

| | Pounds |
|---|---|
| Partially esterified tall oil rosin fraction | 143 |
| Lime Ca(OH)$_2$ | 9 |
| Mineral Spirits | 60 |
| Calcium Acetate | 1 |

The esterified rosin fraction is heated to 450° F. after which five pounds of lime are sifted in. The mixture is then held for fifteen minutes, at which time one-quarter pound of calcium acetate is added. Two pounds of lime are then sifted in and the mixture is held for thirty minutes. One-quarter pound of calcium acetate is then added and the balance of the lime is added as before. A further quarter pound of calcium acetate is added and the temperature raised to 525° F. and held for thirty minutes. The final quarter pound of calcium acetate is then added and the mixture held at 525° F. for one hour. At this point the product forms a clear dry amber pill. It is then cooled to 350° F. and the mineral spirits are added. The resultant product has the following properties:

| | |
|---|---|
| Viscosity at 25° C. | K-M (Gardner Holdt) |
| Solids | 70% |
| Solvent | 30% |
| Color | 12 (Gardner) |

A further use for the partially esterified rosin acid fraction is as a vehicle for a fast drying drum enamel. The following formula illustrates such use:

| | Pounds |
|---|---|
| Partially esterified tall oil rosin fraction | 143 |
| Calcium acetate | 20 |
| China-wood oil | 100 |
| Mineral spirits | 250 |
| Lead naphthenate 24% | 6 |
| Cobalt naphthenate 6% | 1¼ |
| Manganese naphthenate 6% | ½ |

The varnish vehicle for this enamel is made by heating the partially esterified tall oil rosin fraction to 450° F. Thereafter the calcium acetate is added slowly and after it has all reacted, the China-wood oil is added and heated to 575° F. Heating is continued at 575° F. for five minutes, after which the heat is discontinued and the batch allowed to cool to 550° F. It is then held at 550–555° F. for one and one-half hours, after which it is removed from the heat and allowed to cool to 400° F. It is then reduced with mineral spirits and the driers are added to produce a product having the following properties:

Oil length _____ 18½ Gallons
Viscosity at 25° C. _____ M (Gardner-Holdt)
Dry _____ Hard 4 hours From the above example it is apparent that the present invention provides a convenient and economical solution to a vexing problem in the handling of rosin fractions of tall oil. The solution which has been attained is a material improvement over what has been the practice heretofore in the treatment of tall oil rosin fractions and is also an improvement to the method of handling rosin itself. This improvement makes possible a material enhancement in the value of tall oil rosin fractions in the eyes of users of such fractions, and thereby increases the economic value of these fractions and of the whole tall oil fractionation process.

While various modifications of the invention have been described, it will be apparent that the invention is not limited thereto, but that other modifications are possible without departing from the spirit of the invention.

We claim as our invention:

1. A partially esterified tall oil rosin fraction, said fraction containing rosin acids in the approximate range of 65–75% and fatty acids within the range of 25–35%, said fraction being esterified with a polyhydric alcohol to the extent that its acid number is reduced from 25% to 50%.

2. A partially esterified tall oil rosin fraction, said fraction containing rosin acids in the approximate range of 68–72% and fatty acids within the range of 28–32%, said fraction being esterified with a polyhydric alcohol to the extent that its acid number is reduced from 25% to 50%.

3. A partially esterified tall oil rosin fraction, said fraction containing approximately 69% rosin acids, approximately 29% fatty acids, said fraction being esterified with a polyhydric alcohol to the extent that its acid number is reduced from 25% to 50%.

4. A partially esterified tall oil rosin fraction, said fraction containing rosin acids in the approximate range of 65–75% and fatty acids within the range of 25–35%, said fraction being esterified with a polyhydric alcohol to the extent that its acid number is reduced by about 40%.

5. A partially esterified tall oil rosin fraction, said fraction containing rosin acids in the approximate range of 68–72% and fatty acids within the range of 28–32%, said fraction being esterified with a polyhydric alcohol to the extent that its acid number is reduced by about 40%.

6. A partially esterified tall oil rosin fraction, said fraction containing approximately 69% rosin acids and approximately 29% fatty acids, said fraction being esterified with a polyhydric alcohol to the extent that its acid number is reduced by about 40%.

7. A partially esterified tall oil rosin fraction, said fraction containing approximately 69% rosin acids and approximately 29% fatty acids, said fraction being partially esterified with approximately 5% by weight of glycerol, the product having an acid number about 40% reduced from that of the original tall oil rosin fraction.

8. A partially esterified tall oil rosin fraction, said fraction containing approximately 69% rosin acids and approximately 29% fatty acids, said fraction being partially esterified with approximately 4% by weight of pentaerythritol, the product having an acid number about 40% reduced from that of the original tall oil rosin fraction.

WESLEY A. JORDAN.
MELVIN S. HERBAN.

REFERENCES CITED

The following references are of record in the file of this patent:

UNITED STATES PATENTS

| Number | Name | Date |
|---|---|---|
| 2,270,947 | Hough | Jan. 27, 1942 |
| 2,432,333 | Palmer et al. | Dec. 9, 1947 |